UNITED STATES PATENT OFFICE.

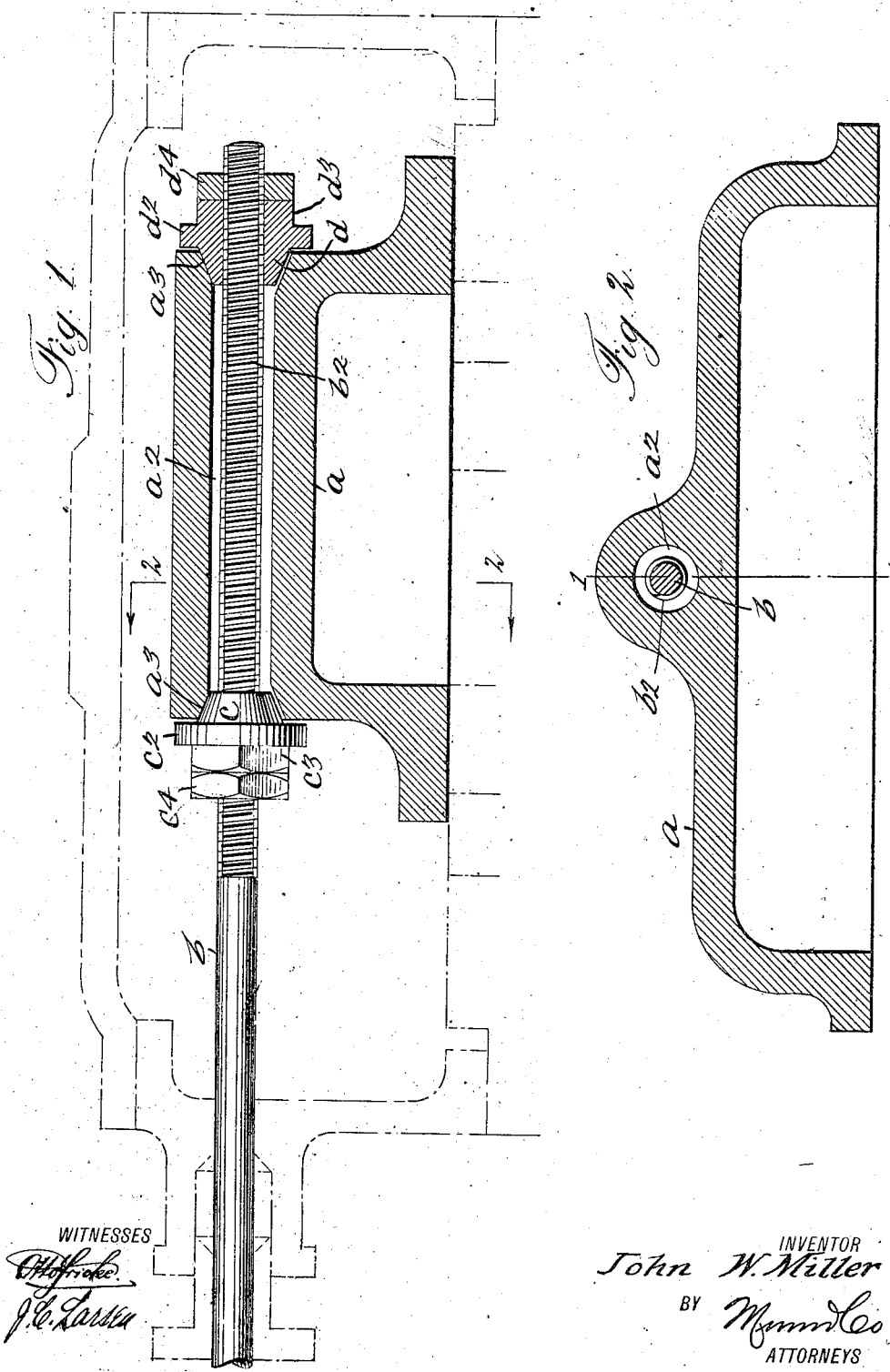

JOHN W. MILLER, OF RANTOUL, ILLINOIS.

SLIDE-VALVE.

1,136,696.　　　Specification of Letters Patent.　　Patented Apr. 20, 1915.

Application filed May 20, 1914. Serial No. 839,758.

*To all whom it may concern:*

Be it known that I, JOHN W. MILLER, a citizen of the United States, and resident of Rantoul, in the county of Champaign and State of Illinois, have invented certain new and useful Improvements in Slide-Valves, of which the following is a specification.

My invention relates to slide valves for engines, and the main object thereof is to provide means whereby such valves will automatically find a seat and which, at the same time, position the valve with respect to the ports.

A further object is to provide conical stops for the valve movement on its rod, whereby the valve travels a predetermined distance up the bevel or incline of the corresponding cone upon the abrupt stop of the rod to begin its reverse movement, this acting as a cushion for the valve to take the valve impact resiliently and thus avoid beating off the flanges at the valve ends, and also the stripping of the screw-threads on the rod.

A further object is to balance or suspend the valve from said cones in order to prevent the same from dragging on its seat, and whereby it will neither stick, cock, nor blow.

My invention is fully set forth in the following specification, of which the accompanying drawings form a part, in which the same parts are designated by the same reference characters in each of the views, and in which:—

Figure 1 is a section taken through a slide valve, showing its connection with the rod thereof, and also showing a portion of the engine cylinder and steam chest in dotted lines, said section being taken approximately on the line 1—1 of Fig. 2; and Fig. 2 is a section taken on the line 2—2 of Fig. 1.

In the drawings forming a part of this application I have shown a slide valve $a$ of substantially conventional construction, but provided with a longitudinal bore $a^2$, and the ends of which are outwardly flared, as shown at $a^3$, a valve rod $b$ being extended through the bore $a^2$ and beyond the outer end of the valve, and said rod is screw-threaded, as shown at $b^2$, for a length exceeding that of the valve.

Threaded on the portion $b^2$ of the rod $b$, at the inner end of the valve, is a cone $c$, having an integral flange $c^2$ thereon and beyond which is an angular nut $c^3$, also integral with the cone, and I also provide a jam-nut $c^4$ on the rod and adapted to be jammed against the angular portion $c^3$ of the cone $c$, and it will be observed that the inner diameter of the cone approximates the diameter of the bore $a^2$ and said cone is tapered outwardly in the same degree as the flared portion $a^3$ of the bore. Also threaded on the said rod, at the opposite valve end, is a cone $d$ in all respects similar to the cone $c$, having a flange $d^2$ and angular portion $d^3$ thereon and adapted to be locked on said rod by means of a jam-nut $d^4$, the details of this construction being clearly illustrated at the right hand end of the valve, in Fig. 1.

In assembling the parts the jam-nut $c^4$ is first threaded onto the rod and into approximate position which it will occupy, after which the cone $c$ and connected members is screwed onto the rod and into close proximity to the jam-nut $c^4$, the valve being then arranged in position with the rod passing therethrough, the cone $d$ being next screwed onto the rod and being followed by the jam-nut $d^4$, and, when said jam-nuts are tightened against their respective cones, the valve is held on the rod but is movable longitudinally thereof between cones, and transversely thereof for a distance determined by the relative diameters of the valve bore and the cones at the points of valve suspension.

If it is desired to adjust the valve with respect to the rod, and thereby with respect to the cylinder ports, all that is necessary is to loosen the jam-nut at the side of the valve toward which the valve is to be moved, revolve the corresponding cone $d$ on the rod until the desired adjustment thereof has been made, lock the same in position, move the valve adjacent, revolve the other cone $c$ until it is in contact with the valve, and then lock the same in this position by means of the jam-nuts $c^4$ and $d^4$, this adjustment of the valve being possible in either direction on the rod, as will be seen.

It will be observed that the bore $a^2$ is of considerably greater diameter than that of the rod $b$, thus providing a space for the movement of the valve on said rod to insure the latter finding its seat, and, when so seated in proper relationship with the cylinder ports, the cones are moved up to just touch the corresponding flared portions of the valve bore, whereby the actual weight of the valve is suspended from the cones but in such manner as to permit both longitudinal and transverse movements thereof with respect to the rod.

While I have shown jam-nuts for locking my cones in position, I do not limit myself thereto, as clamps or other devices may be substituted therefor, my invention residing in the readily adjustable means for holding said valve in desired position on the valve rod, and permitting end play of said valve in the reciprocation of said rod, and various other changes in and modifications of the details shown and described may be made, within the scope of the following claims, without departing from the spirit of my invention, or sacrificing its advantages, and, With a reservation to myself of all such changes, what I claim as new, and desire to secure by Letters Patent, is:

1. In an engine, the combination of a slide valve having a relatively large bore longitudinally arranged therein and the ends of which are outwardly flared, a screw-threaded rod passed through said bore, and adjustable, cone shaped, locking means for said valve on said rod, and engaged in said flared ends of said bore.

2. In an engine, the combination of a slide valve having a relatively large longitudinal bore therethrough, the ends of which are outwardly flared, a screw-threaded rod passed through said bore, adjustable, cone shaped, nuts on said rod, at each valve end, engaged in corresponding flared bore ends, to lock said valve to said rod, and means for locking said nuts against movement.

3. In an engine, the combination of a slide valve having a relatively large bore longitudinally arranged therein and the ends of which are outwardly flared, a screw-threaded rod passed through said bore, adjustable, cone shaped, nuts on said rod, one at each valve end and engaged in the corresponding flared end, to lock said valve on said rod, and means for locking said nuts against movement, the inclination of said flared ends and nuts being such as to take the longitudinal end thrust of said valve on said rod in a resisting manner by reason of the weight of said valve, and each of said nuts having a flange thereon to limit such end thrust.

In testimony whereof I have signed my name to this specification in the presence of the subscribing witnesses.

JOHN W. MILLER.

Witnesses:
  ADAM DECK,
  WILLIAM C. PATTERSON.